May 24, 1960 A. C. SANFORD 2,937,418
WOOD TRUSS HEEL JOINT CONSTRUCTION
Filed Nov. 14, 1957 2 Sheets-Sheet 1
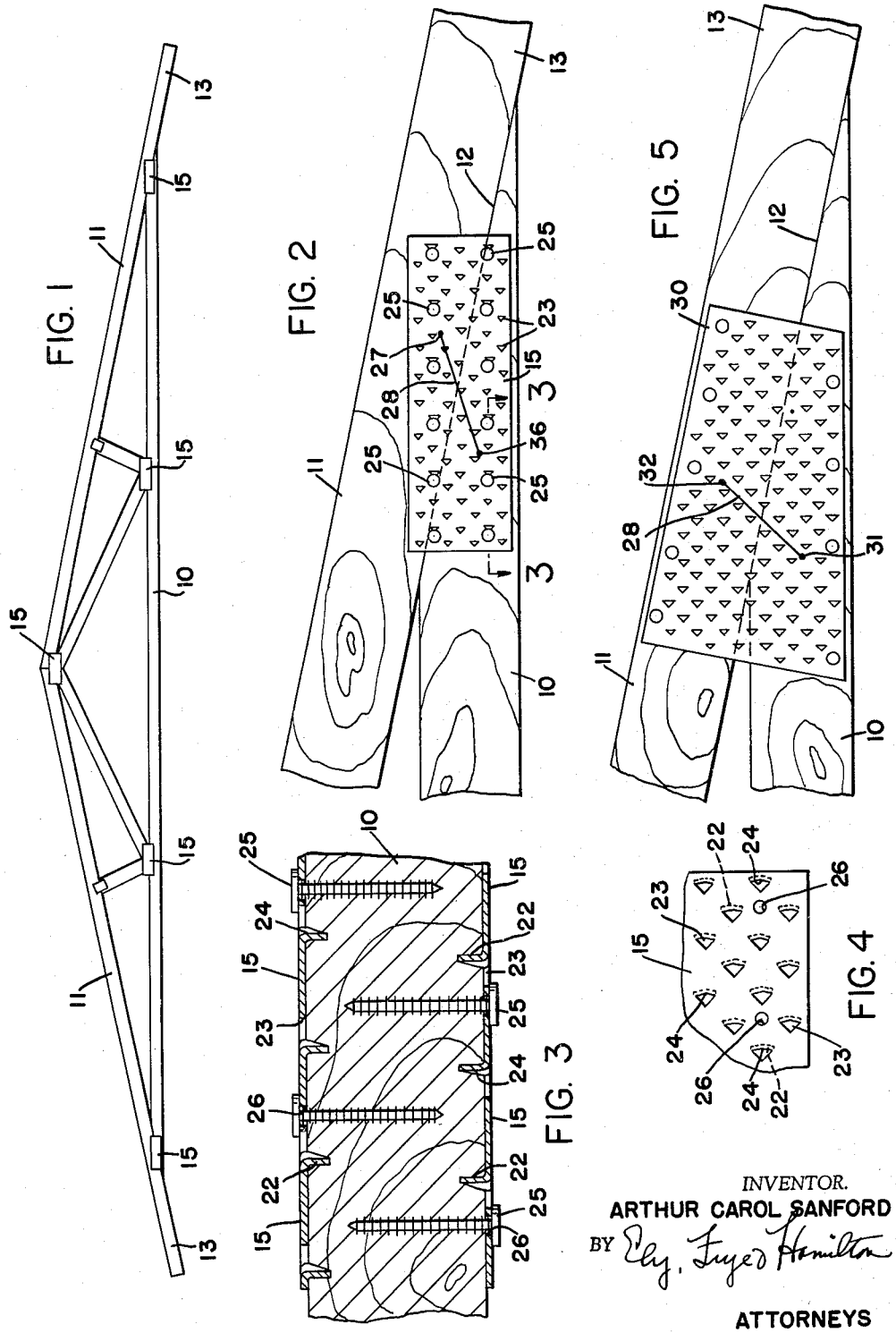
INVENTOR.
ARTHUR CAROL SANFORD
BY
ATTORNEYS

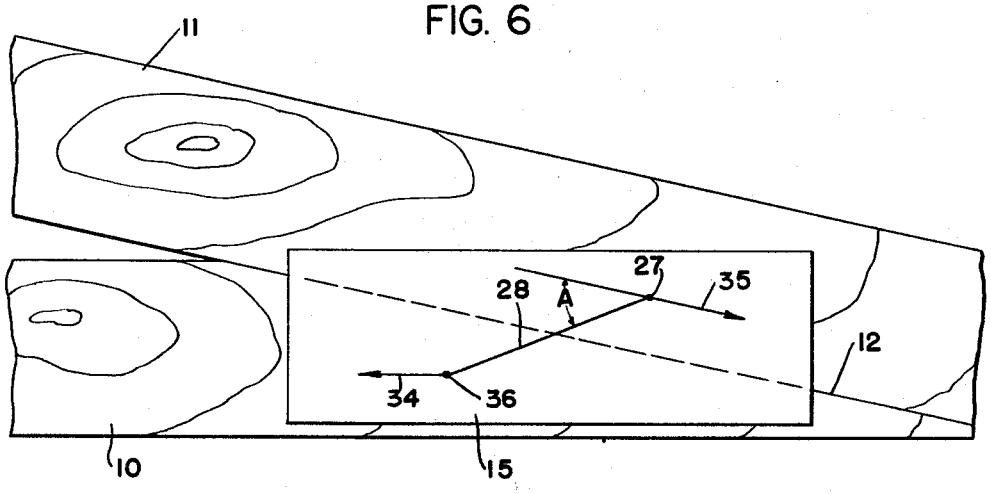

United States Patent Office 2,937,418
Patented May 24, 1960

2,937,418

WOOD TRUSS HEEL JOINT CONSTRUCTION

Arthur Carol Sanford, 2609 NE. 8th St., Sunrise, Fort Lauderdale, Fla.

Filed Nov. 14, 1957, Ser. No. 696,378

4 Claims. (Cl. 20—92)

This invention relates generally to wood trusses normally used to support a roof, and more particularly to a truss joint having wood members in one plane connected by metal plates having teeth embedded in opposite sides of said members. This application is a continuation-in-part of my copending application Serial No. 414,365, filed March 5, 1954, and now Patent No. 2,827,676.

Said application Serial No. 414,365 discloses truss joints having punched-out toothed plates embedded in opposite sides of the joint, and the plates on opposite sides of the heel joints are trapezoidal in shape with a few corrugated stitching nails driven into wood through tooth openings along the edges of the plates.

Actual tests to failure of such joints in tension showed that the plates failed by buckling along angular lines substantially diagonally of the plates, causing the teeth to pull out of the wood. This buckling indicated that although the joint was in tension, a substantial part of the stresses in the plates was compression, due to opposed rotating forces within each plate.

An important advantage of using plates having a multiplicity of teeth pressed into opposite sides of a joint is that the stresses are distributed uniformly over a relatively large area without injuring or weakening the wood fibers. The joint is unusually strong because all of the stresses are distributed and absorbed by the aggregate shear strength of the many teeth without concentrating the stresses at one or a few points. However, when compressive forces cause buckling of the plates and pulling out of the teeth, the joint fails long before the aggregate shear strength of the teeth is reached.

I have discovered that making the plates in the shape of relatively long and narrow rectangles substantially increased the strength of the joint per unit area because the principal stresses in the plates are tension stresses, and the compressive stresses and corresponding tendency of the plates toward buckling are minimized. Inasmuch as two plates are used on each joint and a large number of trusses is used in a building, the saving effected by thus reducing the area of the plates required for a given load is very substantial. I have also discovered that the holding power of the stitching nails is increased by providing tightly fitting nail holes therefor independent of the punched-out tooth holes, and by locating the nails in definite patterns.

It is an object of the present invention to provide an improved wood truss joint having toothed connector plates in which the strength of the joint is substantially increased per unit area.

Another object is to provide an improved wood truss joint having toothed connector plates so constructed and arranged as to subject said plates principally to tension stresses to substantially prevent buckling of the plates under maximum loads.

A further object is to provide an improved wood truss joint having toothed connector plates secured to opposite sides of the joint by closely spaced stitching nails passing through tightly fitting holes in the plates and preferably arranged in straight lines longitudinally of the plates.

These and related objects are accomplished by the improved heel joint of the present invention comprising relatively long and narrow plates covering substantially equal triangular areas of the two wood chord members of the joint, with two parallel longitudinal lines, one for each triangular area of stitching nails passing through tightly fitting holes in each plate into the individual chord members. A preferred embodiment of the invention is shown by way of example in the accompanying drawing and described in detail herein.

In the drawings:

Fig. 1 is a side elevation of a low pitch wood truss having toothed plates at the joints.

Fig. 2 is an enlarged side elevation of one of the heel joints of said truss.

Fig. 3 is an enlarged plan sectional view on line 3—3 of Fig. 2.

Fig. 4 is an enlarged fragmentary side elevation of one of the plates in Fig. 2 detached from the joint.

Fig. 5 is an enlarged side elevation similar to Fig. 2, showing one of the old style trapezoidal plates disclosed in Serial No. 414,365.

Fig. 6 is an enlarged schematic view similar to Fig. 2 showing a stress diagram as related to the centroids of the two triangular areas of each plate attached to the chord members.

Fig. 7 is a similar schematic view of the joint shown in Fig. 5.

The improved truss shown in Fig. 1 may be a W type truss as shown, and is composed of top and bottom chord members and strut members connected together in one plane. The bottom chord member 10 extends the full span of the truss, and the top chord members 11 rest on and may overhang the ends of member 10, as shown. The chord members 10 and 11 may be standard size wood members such as two by fours.

As best shown in Fig. 2, the ends of the bottom chord may have their upper surfaces beveled off, forming inclined surfaces 12 conforming to the slope of the top chords 11 where the top chords 11 rest on the bottom chord, the top chords extending continuously in full cross section to form the overhanging portions 13 for supporting an overhanging roof.

The improved truss is of relatively low pitch such as 2½ over 12, and may have a relatively long span of 60 feet and over. The novel rectangular connector or grip plates indicated at 15 may be used at several of the joints of the truss but are particularly desirable at the heel joints where the greatest opposing stresses are present between the upper chord members 11 in compression under load and the lower chord member in tension under load.

The metal plates 15 are relatively long and narrow and are provided with a multiplicity of closely spaced teeth or pointed projections 22 (Fig. 3) punched out of the metal, which is preferably galvanized or otherwise coated to be corrosion resistant. I have found that 20 gauge sheet steel is preferable because that gauge is thin enough to facilitate penetration into and between the wood fibers without damaging them materially, and is thick enough to give the teeth substantial strength in shear.

The teeth 22 are preferably triangular and punched or bent out substantially at right angles to the plane of the plate, as shown in Fig. 3, so that they penetrate readily into the fibers of the wood members when pressure is applied normal to the outer surface of the plate. Each tooth or projection 22 forms a substantially triangular opening 23 in the plate. The size of the projections may be varied somewhat, but excellent results are obtained by making the projections substantially isosceles triangles about ¼ inch on each side with an altitude at the apex of about ¼ inch, and spacing the projections on about 1 inch centers in staggered rows about ½ inch apart so that there are approximately two teeth to each square inch.

Each tooth 22 is preferably crimped or dished along a line 24 extending from the apex to the base, or in other words, dished transversely of the direction of the tooth into the wood, as best shown in Figs. 3 and 4. This crimping materially increases the rigidity and strength of each tooth in shear and bending against forces imposed parallel to the plane of the plate and placing the plate in tension. Moreover, the slightly dished shape of the teeth facilitates their penetration into the grain of the wood without shearing the fibers.

The combined or aggregate shear strength of the teeth 22 is substantially equal to the tensile strength of the plate, so that if the plate is maintained in tension the tensile strength of the plate is its critical strength. However, if the plates at a joint are subjected to substantial compression stresses, the plate will fail first by buckling so that the ultimate strength of each plate is not utilized.

As illustrated in Fig. 2, the rectangular plates 15 are placed on opposite sides of a heel joint with the longitudinal axis of each plate horizontal and the underlying areas of the top and bottom chord members 11 and 10 substantially equal and substantially triangular in shape. In other words, the diagonals of the plates approach or substantially coincide with the plane of the inclined surface 12 of the lower chord members. If desired, the teeth 22 on opposite plates may be turned in opposite directions.

The plates 15 may be easily and quickly applied in proper location over the joints by first tacking the plates in position with stitching nails 25 hammered or driven through the plates into the wood. After the plates are thus tacked in place with the teeth contacting or partially penetrating the wood, the plates are subjected in a press to substantial mechanical or hydraulic pressure to embed the teeth as well as the nails into the wood fibers with the plates tightly abutting the sides of the wood members. The nails 25 may have corrugated or screw shanks to increase their holding power.

The plates are provided with individual holes 26, independent of the triangular holes 23, for tightly fitting the shanks of nails 25, so that once the nails have been fully pressed into the wood, the nails provide additional shear strength which would not be present if the nails passed through larger holes such as the triangular openings 23. Moreover, the tight holes ensure that the nails are driven at right angles to the plates, and aid in preventing rocking or wobbling of the nails under stress with a consequent prying or pulling away of the plates from the wood surfaces.

As shown in Fig. 2, the nails are preferably arranged in two horizontal lines spaced inwardly of the top and bottom edges of the plates and in line with the second inner row of teeth. The nails are preferably spaced apart vertically a distance of about two inches and are spaced apart horizontally at intervals of about every two teeth, so that the nails are located approximately on 2 inch squares throuhout the plates. Thus, substantially all of the nails of the upper row penetrate the upper chord member 11, and substantially all of the nails of the lower row penetrate the lower chord 10. Moreover, the two lines or rows of nails 25 are spaced vertically in such manner as to lie substantially along the median lines of the upper and lower halves of the plate, thus applying maximum holding power to resist prying or pulling out of the teeth under load.

By using the novel grip or connector plates on opposite sides of the truss joints, and particularly the heel joints where the greatest stresses are transmitted, the pitch of the truss can be lowered and its span increased as compared with conventional types of trusses used for low cost housing, because there is no requirement to notch the chord members, or pass bolts therethrough, or otherwise weaken the chord members.

By utilizing relatively long and narrow plates 15 and placing them over the heel joint with their longitudinal axes horizontal and their diagonals approaching the plane of the inclined abutting chord surfaces, so that they cover substantially triangular and equal areas on the two chord members, the opposing forces transmitted through the plates from the chord members maintain the plates principally in tension at all times. Obviously, if the truss were somewhat steeper in pitch, the plane of abutting surface 12 would more closely approach the diagonal of the plate. The improved plate thus enables utilizing the maximum strength of the plates as derived from the aggregate shear strength of the teeth uniformly distributed throughout the entire areas of the wood chord members.

Referring to Figs. 6 and 7, when a plate 15 is pressed into the side of a heel joint between chord members 10 and 11, the directions of opposing forces transmitted through the plate by the chord members 10 and 11 under load are represented by the arrows 34 and 35, respectively, and the forces transmitted through the plate can be considered as concentrated at the centroids 36 and 27, respectively, of the substantially triangular areas overlying the respective chord members. Since the forces represented by the arrows substantially oppose each other, the centroid 36 over the lower chord can be considered as a stationary point with the other centroid 27 connected thereto by a moment arm 28.

Due to the distance the centroids 36 and 27 are apart longitudinally of the plate 15, the forces 34 and 35 place the plate principally in tension because the acute angle A between the force 35 and the moment arm 28 results in relatively little torque or compressive force transmitted through the plate. Thus, the tendency toward bucking of the plate under heavy loads is greatly minimized.

In contrast, the trapezoidal plate 30 of Figs. 5 and 7 is substantially greater in area and has its centroids 31 and 32 of the areas overlying the chord members 10 and 11 much closer together longitudinally of the plate. As a result, the force represented by arrow 35 is at a much greater angle A with the moment arm 28, and exerts a substantial torque or compressive force through the plate resulting in buckling of the plate under load and pulling the teeth out of the chord members long before the ultimate strength of the plate in tension is utilized. Actual tests to failure of a joint such as shown in Figs. 5 and 7 in tension show that the plate buckles in ridges substantially parallel to its diagonal, without any indication of failure of the teeth in bending or shear.

As indicated in Fig. 6, the angle A between force 35 and moment arm 28 is about 35°, whereas the same angle A in the joint of Fig. 7 is about 61°. I have determined that if this angle does not exceed 45° the stresses transmitted through the plate are principally tension so that failure of the plate due to buckling is minimized, whereas as said angle is increased beyond 45° the torque or compressive force increases to the point of substantially weakening the joint. Obviously, however, the smaller is the angle the stronger is the joint because the greater is proportion of tension forces through the plate.

Comparative tests in tension of the joints illustrated in Figs. 2 and 3 have shown that the plates in Fig. 2 will resist maximum loads equivalent to 200 pounds per tooth, whereas the maximum loads sustained by the plates in the joint of Fig. 3 are equivalent to 118 pounds per tooth.

Accordingly, the improved truss joint having long narrow rectangular connector plates provides a joint having substantially increased strength per unit area, thus effecting a substantial saving in the size of the plates required for given loads. Moreover, the strength of the plates is furter increased by the shear strength of the stitching nails securing the plates to the sides of the joint.

What is claimed is:

1. In a wood truss structure having a top chord member resting on the end of a bottom chord member in the same plane and forming a heel joint, the abutting surface of said bottom chord member being inclined parallel to said top chord member, metal grip plates having their top and bottom edges substantially parallel to the bottom edge of the bottom chord abutting both sides of said heel joint and having a multiplicity of closely spaced pointed teeth distributed substantially uniformly throughout the areas of said plates, said teeth embedded into the wood of the top and bottom chord members, said plates being located with one diagonal of each plate approaching the plane of said bottom chord abutting surface to form two substantially equal triangular-like areas overlying the top and bottom chord members, and the plates each having such dimensions that a line connecting the centroids of said areas is at an angle not greater than 45° to a concentrated force line extending in the direction of the top chord member passing through the centroid of said plate area overlying the top chord member.

2. In a wood truss structure having a top chord member resting on the end of a bottom chord member in the same plane and forming a heel joint, the abutting surface of said bottom chord member being inclined parallel to said top chord member, metal grip plates having their top and bottom edges substantially parallel to the bottom edge of the bottom chord abutting both sides of said heel joint and having a multiplicity of closely spaced pointed teeth distributed substantially uniformly throughout the areas of said plates, said teeth embedded into the wood of the top and bottom chord members, said plates being located with one diagonal of each plate approaching the plane of said bottom chord abutting surface to form two substantially equal triangular-like areas overlying the top and bottom chord members, a line of stitching nails in each area securing the plates to the chord members, and the plates each having such dimensions that a line connecting the centroids of said areas is at an angle not greater than 45° to a concentrated force line extending in the direction of the top chord member passing through the centroid of said plate area overlying the top chord member.

3. In a wood truss structure having a top chord member resting on the end of a bottom chord member in the same plane and forming a heel joint, the abutting surface of said bottom chord member being inclined parallel to said top chord member, metal grip plates having their top and bottom edges substantially parallel to the bottom edge of the bottom chord abutting both sides of said heel joint and having a multiplicity of closely spaced pointed teeth distributed substantially uniformly throughout the areas of said plates, said teeth embedded into the wood of the top and bottom chord members, said plates being located with one diagonal of each plate approaching the plane of said bottom chord abutting surface to form two substantially equal triangular-like areas overlying the top and bottom chord members, a line of stitching nails in each area passing through tightly fitting individual holes in said plates and securing the plates to the chord members, and the plates each having such dimensions that a line connecting the centroids of said areas is at an angle not greater than 45° to a concentrated force line extending in the direction of the top chord member passing through the centroid of said plate area overlying the top chord member.

4. In a wood truss structure having a top chord member resting on the end of a bottom chord member in the same plane and forming a heel joint, the abutting surface of said bottom chord member being inclined parallel to said top chord member, metal grip plates having their top and bottom edges substantially parallel to the bottom edge of said bottom chord, said plates abutting both sides of said heel joint and having a multiplicity of closely spaced pointed teeth distributed substantially uniformly throughout the areas of said plates, said teeth embedded into the wood of the top and bottom chord members, each of said plates being located with substantially equal triangle-like areas overlying the top and bottom chord members, and each plate having such dimensions that a line connecting the centroids of said areas is at an angle not exceeding 45° to a concentrated force line for the top chord member passing through the centroid of the plate area overlying the top chord member.

References Cited in the file of this patent

UNITED STATES PATENTS 2,827,676    Sanford _____ Mar. 25, 1958